(12) United States Patent
Bishop et al.

(10) Patent No.: US 8,259,308 B2
(45) Date of Patent: Sep. 4, 2012

(54) SENSOR SYSTEM AND METHOD FOR DETECTING MISALIGNED TRAYS AND/OR MIS-POSITIONED UTENSILS IN A DIRECT RECIRCULATING OVEN

(75) Inventors: Blane Bishop, Holly Springs, NC (US); Greg Clark, Clayton, NC (US); Tim Hinterman, Clayton, NC (US)

(73) Assignee: Baking Acquisition LLC, Clayton, NC (US)

( * ) Notice: Subject to any disclaimer, the term of this patent is extended or adjusted under 35 U.S.C. 154(b) by 284 days.

(21) Appl. No.: 12/791,307

(22) Filed: Jun. 1, 2010

(65) Prior Publication Data

US 2010/0302556 A1 Dec. 2, 2010

Related U.S. Application Data

(60) Provisional application No. 61/182,397, filed on May 29, 2009.

(51) Int. Cl.
*G01B 11/14* (2006.01)
*A47J 37/00* (2006.01)

(52) U.S. Cl. ........... 356/614; 356/621; 219/492; 99/337

(58) Field of Classification Search .......... 356/614–623; 219/762, 679, 492; 99/337
See application file for complete search history.

(56) References Cited

U.S. PATENT DOCUMENTS

| | | | | |
|---|---|---|---|---|
| 4,553,843 A * | 11/1985 | Langley et al. | ............... | 356/621 |
| 6,118,538 A * | 9/2000 | Haugan et al. | ............... | 356/623 |
| 6,300,606 B1 * | 10/2001 | Engelmann et al. | .......... | 219/492 |
| 2009/0051933 A1 * | 2/2009 | Stimpson et al. | ............. | 356/614 |

* cited by examiner

*Primary Examiner* — Hoa Pham
(74) *Attorney, Agent, or Firm* — Leydig, Voit & Mayer, Ltd

(57) ABSTRACT

A system and method for diagnosing a misalignment condition during operation of a continuous oven, which includes a conveyor system conveying and positioning trays carrying panned baked goods within an oven bake chamber defined at least in part by two side panels extending parallel to one another. The system includes an optical sensor arrangement having a transmitter and a receiver disposed along a line of sight, the line of sight extending across a location of the oven bake chamber such that a misaligned tray or mis-positioned utensil moving on the conveyor system disposed within the oven cavity interrupts the line of sight, which in accordance with the method causes the optical sensor system to provide a signal indicative of the misalignment condition.

20 Claims, 6 Drawing Sheets

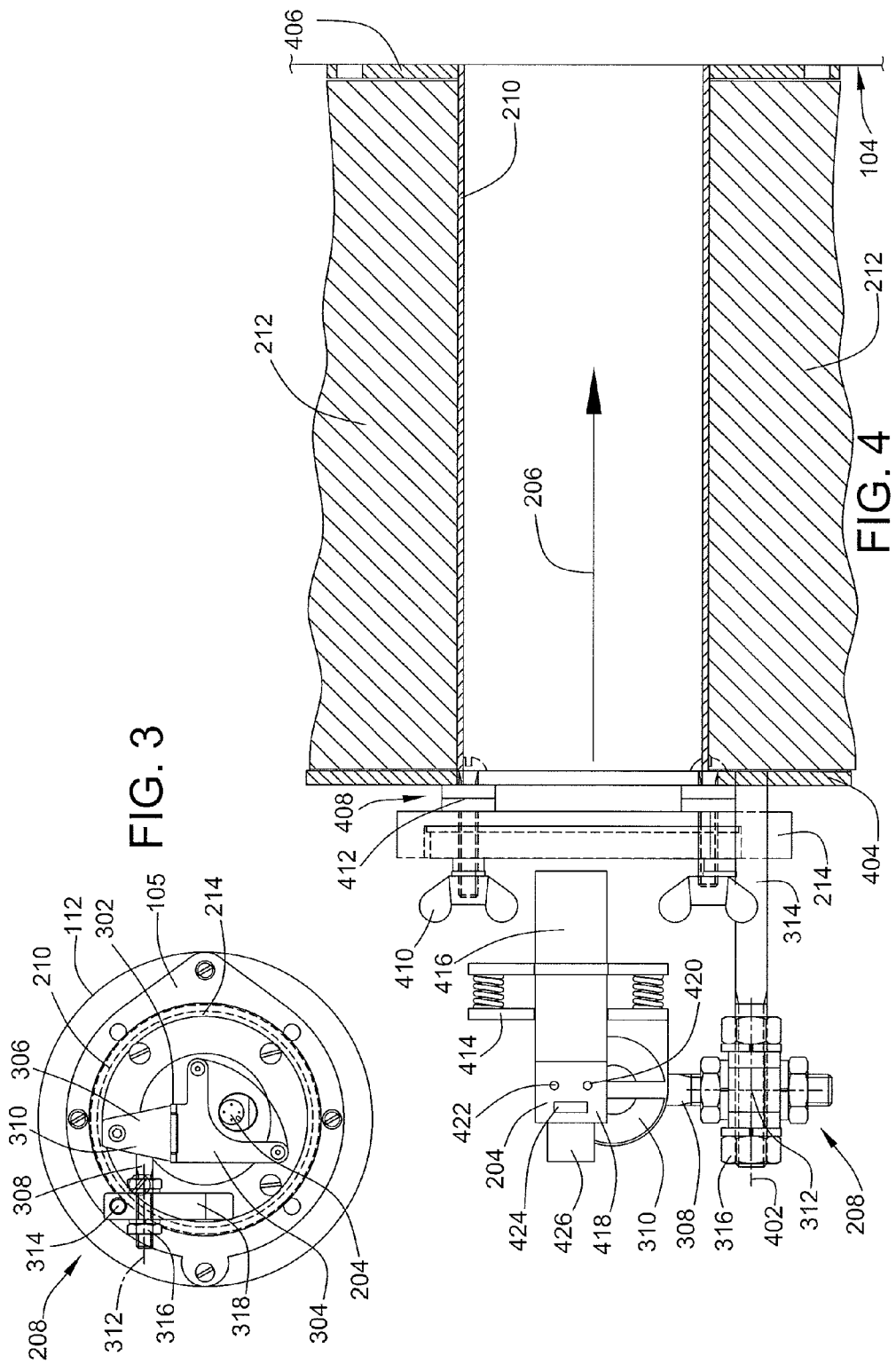

SENSOR SYSTEM AND METHOD FOR DETECTING MISALIGNED TRAYS AND/OR MIS-POSITIONED UTENSILS IN A DIRECT RECIRCULATING OVEN

CROSS-REFERENCE TO RELATED APPLICATIONS

This patent application claims the benefit of U.S. Provisional Patent Application No. 61/182,397, filed May 29, 2009, which is incorporated herein in its entirety by reference.

BACKGROUND OF THE INVENTION

Commercial production of baked goods typically uses baking devices or ovens disposed to bake goods in a continuous fashion, for example, goods to be baked that are packaged in pans, with or without lids, also known as products, and placed on trays passing through an oven along a conveyor. In some applications, such ovens are formed as a tunnel surrounding a conveyor system carrying pans filled with product to be baked or, alternatively, product placed directly on a wire-mesh conveyor belt. Burners are disposed around the conveyor system and direct heat to bake and/or improve the appearance of the goods passing through the oven.

One known type of failure for such ovens may occur when product is placed on trays of the conveyor system and is misaligned or otherwise mis-positioned on the tray, such that portions of pans and/or lids, also known individually and collectively as utensil(s), extend over the edges or above the topmost clearance of the tray. The protruding portions of such mis-positioned utensils can tilt a tray sufficiently to "plow" a path that is outside the expected path of the goods carried in the conveyor, which can cause contact with burners, coloraiders, or other internal components of the oven, causing damage.

There are typically two types of tilted or misaligned tray conditions. The first condition is a slightly tilted tray which is recognized during production as a needed maintenance correction during a scheduled downtime. These planned corrections may eliminate or reduce the possibility of pans or lids sliding off tilted trays while inside the oven, most importantly for those ovens with a conveyor, which transitions from a higher rear-travelling portion to a lower front-travelling portion. The second condition is a pan or lid that is mis-positioned at loading and requires immediate corrective action. The potential for significant damage is presented when a pan or lid can interfere with the movement of a tray at the rear of the oven. A frequent cause of serious damage to coloraiders, which are internal air circulators that provide an appealing color to baked goods, and burners occurs during the transition of trays from one portion or section of the conveyor to another. A poorly positioned pan or lid can tilt a tray sufficiently to allow misaligned portions of a tray to "plow" a path through vital oven components virtually undetected until substantial damage and expensive production downtime occurs.

One known method of detecting misalignment conditions within a continuous oven is by use of trip wires. Such trip wires are connected, at least at one end thereof, to sensors capable of detecting a change in tension or breakage of the wire. The wires of a known arrangement extend across and/or over the conveyor system such that a tray or product protruding from the conveyor may make contact with the wire. Such contact may at least cause tension in the wire, which causes the sensor to provide a signal to a control device that may alert an operator of the misaligned condition.

Another known method of detecting tray or product misalignment within a direct recirculating oven is by use of devices disposed to monitor the electric load utilized by the conveyor system of the oven. Such devices are essentially electric load sensors disposed to measure the electric current, voltage, and/or power provided to drive the conveyor system. One can appreciate that a load increase in the power provided to the conveyor is liable to increase following contact between, for example, a misaligned tray with a stationary oven component.

Both known methods of detecting misaligned conditions within direct recirculation ovens have disadvantages. For example, meticulous calibration of the trip wires is required insofar as the tension in the wires can change with changing operating temperatures in the oven. Moreover, contact between a misaligned tray and a trip wire can break the wire, necessitating a shut down and cool down of the oven to facilitate replacement of the wire. Further, an indication from the electric load sensors that a contact between moving and stationary elements has occurred is given only after such contact has occurred, which typically means that damage may already have occurred to oven components. Even further, reliable indications from the electric load sensors presupposes a meticulous calibration of the normal electric loads of the system, which may change over time due to wear in the moving parts of the system, less than optimal lubrication, and debris accumulation at the various moving joints of the conveyor system.

BRIEF SUMMARY OF THE INVENTION

The invention provides a system and method for diagnosing a misalignment or mis-position condition during operation of a continuous or direct recirculation oven. In one embodiment, the oven includes a conveyor system conveying and positioning trays carrying pans of baked goods, with or without lids, within an oven cavity defined at least in part by two side panels extending parallel to one another. The system includes an optical sensor arrangement having a transmitter and a receiver disposed on opposite sides of the oven cavity along a line of sight, the line of sight extending across a location of the oven cavity such that a misaligned tray or mis-positioned utensil moving on the conveyor system disposed within the oven cavity interrupts the line of sight, which in accordance with the method causes the optical sensor system to provide a signal indicative of the misalignment or mis-position condition.

In one disclosed embodiment, a transmitter is configured to provide a beam along the line of sight, which is received by the receiver. In an alternative embodiment, a transmitter portion of a transceiver provides a beam to a reflector along the line of sight. The reflector reflects the beam, which is received by a receiving portion of the transceiver. In either embodiment, the beam travels across a sensing area of the oven along the line of sight, such that an interruption of the beam will indicate a misalignment or mis-position condition of trays or utensils in the oven.

BRIEF DESCRIPTION OF THE SEVERAL VIEWS OF THE DRAWINGS

FIG. 3 is a side view of a sensor assembly mounted on a side panel of an oven in accordance with the disclosure.

FIG. 4 is a cross section of a sensor assembly installation in an oven in accordance with the disclosure.

DETAILED DESCRIPTION OF THE INVENTION

Figure 1:
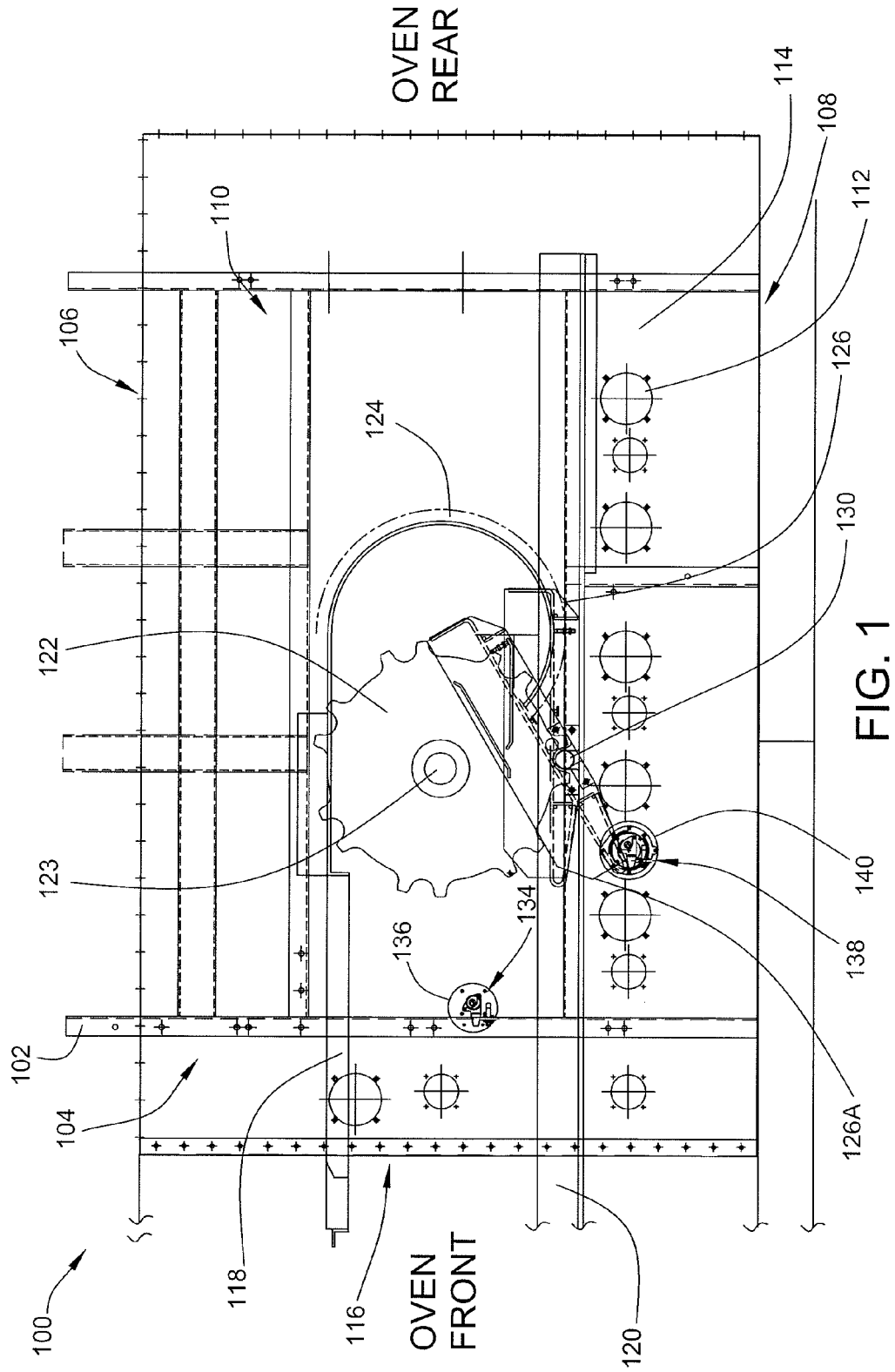
FIG. 1 is a partial elevation of a rear portion of a continuous oven in accordance with the disclosure.

In one embodiment, an optical sensor system is used instead of, or in addition to, known systems for detecting tray misalignment or utensil mis-positioning in a direct recirculating oven. The embodiment described uses Class-2 Laser-Based sensors to detect tray misalignment or utensil mis-position and to trigger a safety trip system for industrial baking ovens. Alternatively, any type of non-contacting sensor may be used. For example, instead of emitting optical energy, such as the laser system disclosed herein, infrared systems, X-ray systems, and so forth, other types of energy may be used, such as sound energy, magnetic flux, and the like. In one disclosed embodiment, two sets of two sensor arrangements are used to detect two different conditions, for example, trays that are tilted or misaligned on a conveyor as well as product utensils overhanging trays. One can appreciate that each of these sensor set arrangements may be used separately, or the two can be used together in the same oven.

Because of the particular structures and methods of use associated with the optical sensor arrangements disclosed herein, the use and implementation of such systems presents an improvement over known misalignment detection systems insofar as there are no structures to reset following a detection of the misalignment condition, there is no replacement of damaged wires required, there are no expansion or contraction conditions of the sensors and related structures requiring meticulous calibration or installation, and other improvements. Moreover, the disclosed systems are better positioned to improve operating efficiency of an oven, as compared with known wire trip systems, by reducing downtime insofar as there are no oven restarts due to false trips from thermal variances, there is no need to adjust wire tensions, no need to reset trip wire switches, and no need to replace broken trip wires.

In general, the disclosed optical system is a non-contacting detection system that includes devices residing outside of the oven chamber but that are arranged to project a beam into and through the oven baking chamber for detecting misalignment of trays or other vessels found therein. In one embodiment, a sensor assembly includes optical, for example, laser, transmitting and receiving devices, which are mounted widthwise at the front and/or rear portions of the oven, for example, near a loader/unloader or near a chain take-up assembly. Laser trips at the rear of the oven may be utilized as pass-by systems to detect longitudinally misaligned trays, since trays can be expected to be at least partially skewed when travelling in the rear portion of the oven. This type of minor or slight misalignment or skew is ordinarily harmless to the operation of the oven and can be attributed to chain strain differentials.

A typical oven conveyor system may include more than one, and sometimes three, chains operating in parallel. Chain strain differentials between single and double-chain sides of the oven allow these chains to stretch at different rates. Subsequently, differing chain lengths cause varying take-up demands between sides, which can result in tray orientations that are skewed with respect to the oven's frame. Consequently, laser trip assemblies that are squarely-mounted to the oven frame may generate beams that can only detect specific points spatially as skewed trays pass by. However, ovens can operate normally with a reasonable amount of tray skewing. In fact, tray skew is often typical and the pass-by detection in accordance with the present disclosure provides a practical application of the disclosed method.

When installed at specific, strategic locations, a laser beam emitted by a transmitter generates a trip beam along a line of sight connecting the transmitter with the receiver. This line of sight, and thus the laser beam, is interrupted when an object, for example, a portion of a misaligned tray, sweeps through and interrupts the line of sight. In the rear portion of the oven, misaligned portions of trays may be detected immediately following transition from the top to the bottom conveyor path, which is an area where destructive misalignment is more likely to occur. Similarly, mis-position conditions of utensils may occur at a front end of the oven during loading of panned product onto trays of the conveyor system. Such interruption, at the front and/or rear portions of an oven, may be detected by the sensors, which can provide a signal indicative of the mis-position condition. This signal can be provided to a device using visual and audible signals that alert equipment trained personnel (e.g., the oven operator), or may be provided to an electronic oven controller that can halt or cease oven operation to avoid or at least minimize damage to oven components due to tilted trays or mis-placed oven utensils. In one embodiment, the optical sensors may be integrated into a stand-alone electrical control panel designed to provide a high degree of flexibility for oven control interlocks.

Trays entering and exiting at the front of the oven are expected to be aligned or square with the frame of the oven. It is contemplated that the optical system, which may be referred to as a Laser Safety Trip System, incorporates beam trip locations at the width-wise front of ovens, in addition to the aforementioned rear positions. For these sensors, laser beams having a line of sight that is aligned or square to the side, front, or rear profile of product entering and/or exiting the oven may be used. In one embodiment, sensors are used to ensure proper positioning of product utensils relative to the frame of the oven at the point of entry. In general, such sensors may detect the profile of each tray at the loading end of the oven, and use specific, spatial-point methods to detect overhang of product utensils. Safety trip events detected at the front opening of the oven can be more easily and readily corrected because of the improved accessibility to the product prior to further entry into the oven.

In effect, utilizing laser trip detection at both ends of the oven, combined with proper maintenance of tilted trays and sufficient chain lubrication practices, can virtually eliminate the possibility of oven component damage due to tray plows. Further, the optical system described herein is well suited for installation during manufacture of new ovens, as well as for retrofit to existing oven installations.

Table 1 below includes a sample list of parts for retrofit (shown in the left column of Table 1) and new equipment (shown in the right column of Table 1) versions of the disclosed Laser Trip System:

TABLE 1

| Retrofit version | New Equipment Version |
| --- | --- |
| Upper Laser Assembly | Upper Laser Assembly |
| (1) Laser Transmitter Assembly | (1) Laser Transmitter Assembly |
|     (1) Laser Transmitter |     (1) Laser Transmitter |
|     (1) Spy-Glass Assembly |     (1) Spy-Glass Assembly |
|     (1) Radiation Warning Placards |     (1) Radiation Warning Placards |
| (1) Laser Receiver Assembly | (1) Laser Receiver Assembly |
|     (1) Laser Receiver |     (1) Laser Receiver |
|     (1) Spy-Glass Assembly |     (1) Spy-Glass Assembly |
|     (1) Radiation Warning Placards |     (1) Radiation Warning Placards |
| (2) Laser Quick Connect Cables | (2) Laser Quick Connect Cables |
| (1) Transmitter Junction Box | Lower Laser Assembly |
| Color coded terminals for ease | (1) Laser Transmitter Assembly |
| of laser cable terminations |     (1) Laser Transmitter |
| (1) Receiver Junction Box |     (1) Spy-Glass Assembly |
|     Color coded terminals for ease |     (1) Radiation Warning Placards |
|     of laser cable terminations | (1) Laser Receiver Assembly |
| (1) 16" × 12" Control panel |     (1) Laser Receiver |
|     Power On Indicator |     (1) Spy-Glass Assembly |
|     Bypass Switch |     (1) Radiation Warning Placards |
| (1) User Manual | (1) Transmitter Junction Box |
| | Color coded terminals for ease |
| | of laser cable terminations |
| | (1) Receiver Junction Box |
| |     Color coded terminals for ease |
| |     of laser cable terminations |
| | (1) 16" × 12" Control panel |
| |     Power On Indicator |
| |     Bypass Switch |
| | (1) User Manual |

One of many potential embodiments for an optical sensor arrangement will now be described. FIG. 1 is a partial elevation of the rear portion of an oven 100. The oven 100 includes a frame 102 supporting side panels 104, a top panel 106, and a bottom panel 108. The panels 104, 106, and 108 enclose an oven chamber 110 within which a temperature and humidity controlled environment is used to bake goods. The temperature of the oven chamber 110 is controlled by use of various burners (not shown) and other devices or methods for circulating heated air around the baked products. In the illustrated embodiment, the oven 100 includes vents directing heated air to specific portions of the baked goods to improve the appearance thereof. Accordingly, vents or coloraider openings 112 are formed along ducts 114 that are disposed along the side panels 104 and are arranged to direct a flow of heated air toward the center or other regions of the oven chamber 110. Even though the rear portion of the oven 100 is discussed in detail herein, the front portion of the oven may be similarly equipped with sensing devices used in the same or similar fashion, as previously discussed without departing from the spirit of the present disclosure.

The goods to be baked are typically moved through the oven chamber 110 via a conveyor system 116. In the illustrated embodiment, the conveyor system 116 includes a top track 118 moving toward the rear of the oven 110, which in the illustration of FIG. 1 is toward the right side of the page. A bottom track 120 is arranged to convey baked product back toward a front end of the oven (not shown), which in the illustration is located toward the left side of the page. In one embodiment, the top and bottom tracks 118 and 120 are channels slidably supporting a chain (not shown) that continuously loops around two sprockets 122 and one shoe 124 disposed in the oven chamber 110. In one installation, three chains are used in parallel with a chain disposed along each of two side panels 104, and a third chain disposed on one side of the oven, which may be referred to as the double chain side. The rear sprocket 122 is disposed in the rear of the oven 110 shown in FIG. 1, and a front shoe (not shown) is disposed at the front end of the oven 110. In the illustrated embodiment, two rear sprockets 122 are disposed to rotate about an axle 123, with each sprocket 122 disposed adjacent to one of the two side panels 104. On the side of the oven having the double chain, a second chain slides around the shoe 124.

In the illustrated embodiment, each rear sprocket 122 is engaged with the chain disposed in the top and bottom tracks 118 and 120, and rotates in a clockwise direction during operation to move product within the oven from the top track 118 to the bottom track 120. Baked products are disposed within pans on trays 126 that are arranged to engage a portion of the chain and move along the top or bottom track 118 or 120 during operation as they cycle through the oven 110. Trays 126 are typically arranged in series along the conveyor system 116.

To transition from the top track 118 to the bottom track 120, a Z-bar assembly (partially shown) connects tray 126 between both chains on the double chain side of the oven to keep the tray 126 level or horizontal. In the illustrated embodiment, each Z-bar assembly includes a pivot shaft 130 extending laterally outward from a bottom portion of each tray 126 and being generally disposed close to the midsection of each tray 126.

One known misalignment condition may occur during transition of a tray 126 from the top track 118 to the bottom track 120. A misaligned tray 126A is shown superimposed with a properly aligned tray 126 in FIG. 1. The tilt of tray 126A can be caused by collision with an obstructing pan or lid that slid off a prior tray. Such misalignment may also be caused by worn Z-bar components or lack of maintenance, for example, insufficient lubrication, or any other known conditions causing misalignment as previously discussed.

The misaligned tray 126A will sweep a path when moving along the bottom track 120, which may cause various portions of the tray 126A to contact functioning components of the oven 100, such as burners, coloraiders, and so forth. In the illustrated embodiment, an early warning system detecting tray misalignment is provided in the form of optical sensors, which can detect tray misalignment by establishing a line of sight detection area within the oven chamber 110. Strategic positioning of such optical sensors may effectively detect a misalignment condition at the earliest feasible time, which advantageously provides an early warning enabling an operator to pause or cease operation of the oven for correcting the misalignment condition before damage is caused to components of the oven.

More particularly, a first sensor assembly 138 is disposed adjacent a rear end of the oven at an opening 140 formed in the side lining panels 104 and disposed below the bottom track 120 along a height that is relatively the same as the height of the coloraider openings 112. The first sensor assembly 138 is disposed to sense the front end portion of the misaligned tray 126A as it sweeps a path along the bottom track 120, thus interrupting a light beam emitted and received by two sensors of the first sensor assembly 138 disposed on opposite sides of the oven chamber 110 (only one side of which is visible in FIG. 1). The first sensor assembly 138 is further disposed to sense product utensils that may slide off a tray 126. In a similar fashion, a second sensor assembly 134 is disposed through a pair of opposed openings 136 formed in the side panels 104. The second sensor assembly 134 is disposed to sense the rear end portion of the misaligned tray 126A as it passes in front of the second sensor assembly 134, thus indicating that a misalignment condition exists.

Figure 2:
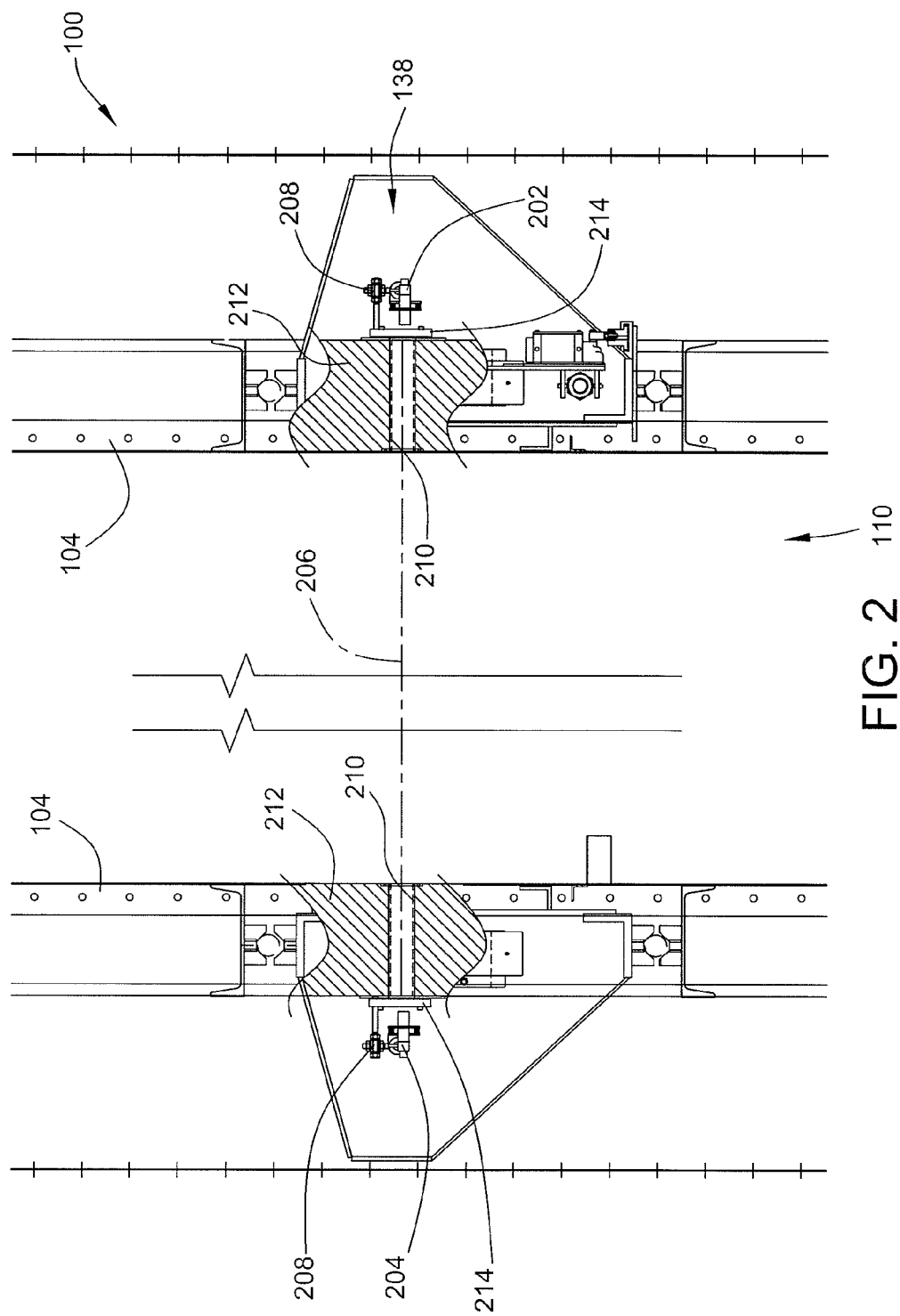
FIG. 2 is a partial cross section from an end view of a sensor assembly installed in an oven in accordance with the disclosure.
Figure 6:
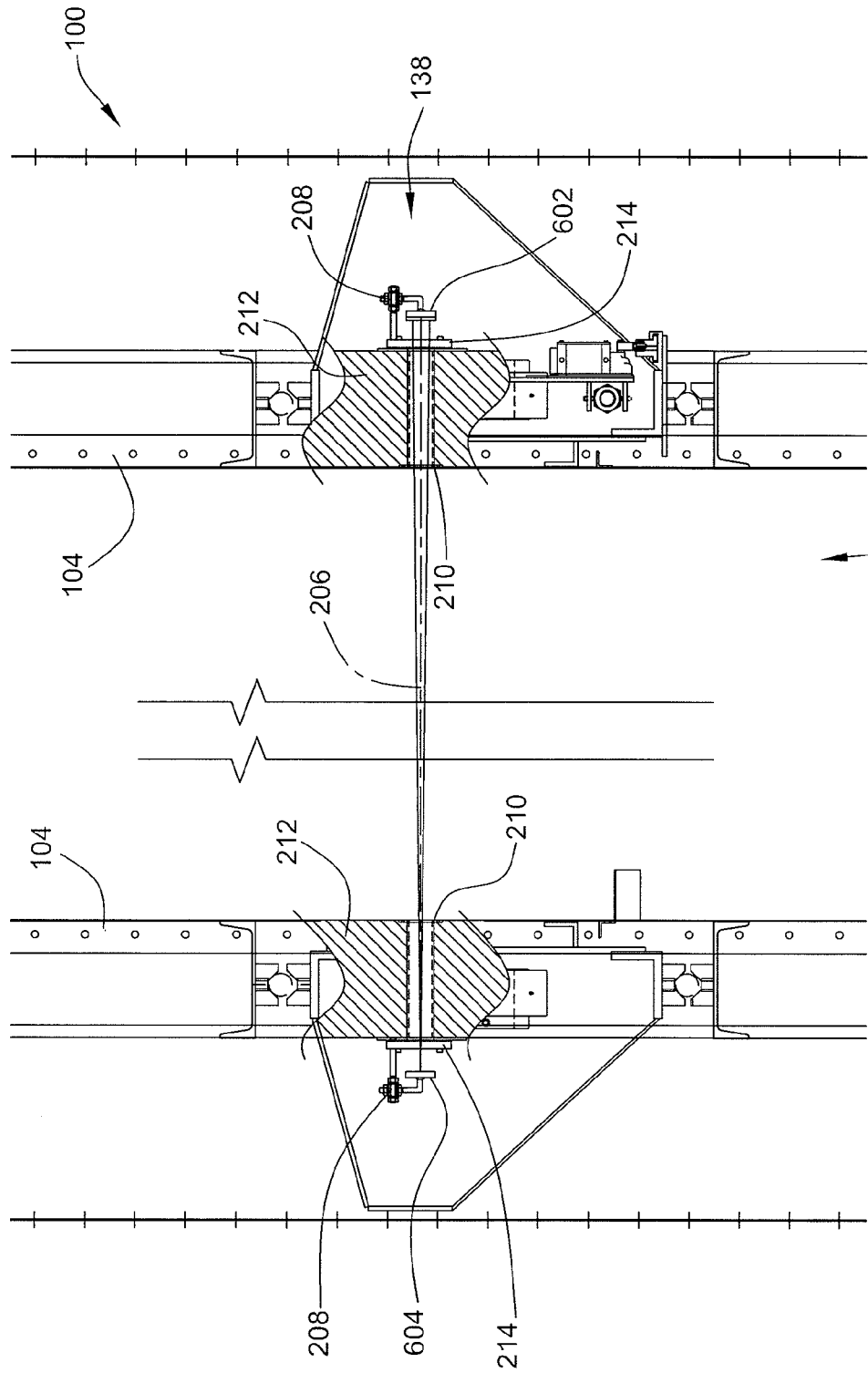
FIG. 6 is a partial cross section from an end view of an alternative embodiment of a sensor assembly in accordance with the disclosure.

A section view from a side perspective of the second sensor assembly 134 as installed in the oven 100 is shown in FIG. 2, with various oven components, for example, the rear sprocket 122, the axle 123, and others, removed for clarity. In the illustrated embodiment, the second sensor assembly includes a transmitter 202 disposed on one side of the oven chamber 110, and a receiver 204 disposed on an opposite side of the oven chamber 110 along a line of sight axis 206. An alternative configuration for the first and/or second sensor assemblies 138 and 134 may include an optical transceiver 602 in the place of the transmitter 202, and a reflector 604 disposed in the place of the receiver 204, as shown in FIG. 6. In FIGS. 2 and 6, elements and features that are the same or similar are denoted by the same reference numerals for simplicity.

The transceiver 602 and reflector 604 may be disposed on either end of the line of sight axis 206. The line of sight axis 206 may be defined by a beam of light, for example, a laser beam, or any other beam of electromagnetic radiation, such as an ultraviolet beam of light, that is continuously or intermittently emitted by the transmitter 202 and received or sensed by the receiver 204. Alternatively, the beam of light may be transmitted by a transmitter portion of the transceiver 602 and received or sensed by a receiver portion of the transceiver 602 after being reflected from the reflector 604. During operation, an object blocking the line of sight 206 and interrupting receipt of the beam travelling along the line of sight 206 will cause a signal to be generated or lost by the receiver 204 or the receiving portion of the transceiver 602, which is indicative of a misalignment condition.

As shown specifically in FIG. 2, each of the transmitter 202 and receiver 204 is supported by its corresponding side lining panel 104 of the oven by an adjustable support bracket 208. In one embodiment, each adjustable support bracket 208 can spatially adjust the position of the transmitter 202 and receiver 204 in three directions to ensure that the line of sight 206 is accurately and reliably established there between when the oven 100 is at operating temperature. When passing through a lateral thickness of each side lining panel 104, the line of sight 206 is protected by tunneling tubes 210 disposed across the side lining panels 104 and protecting the line of sight axis 206 from interruption by oven components, for example, insulating material 212 occupying the space within the side lining panels 104. A porthole cover 214 made of a heat resistant and light transmissive material, for example, Pyrex®, is disposed on an outer side of each tunneling tube 210 to protect the transmitter 202 and receiver 204 from convective heating emanating from within the oven chamber 110, without obstructing the path of the beam travelling along the line of sight 206. A similar configuration may be used to mount the transceiver 602 and reflector 604, as shown in FIG. 6.

A detail view of assembly 138, and particularly an installation of the receiver 204 within a coloraider opening 112 is shown from a side perspective in FIG. 3. In the description that follows, elements that are the same or similar to elements already described are denoted by the same reference numerals as previously used. Moreover, the installation of the transmitter 202 can be the same or similar to that of the receiver 204, the transceiver 602 (FIG. 6), or the reflector 604 (FIG. 6), hence, the installation of the receiver 204 is described in detail herein but it is contemplated that the other components may be installed in the same or similar fashion.

Accordingly, the receiver 204 is supported by a hinged bracket 302 having a pivoting portion 304 and a support portion 306. The pivoting portion 304 can swing or pivot relative to the support portion 306 to allow access to the tunneling opening within the tube 210 for cleaning or service without substantially affecting alignment of the receiver 204 relative to the side panel 104.

The support portion 306 is connected to a stem 308 of the adjustable support bracket 208. In one embodiment, the stem 308 is a threaded rod having a hinge 310 at one end thereof that is capable of changing the axial and angular position of the support portion 306 relative to a major dimension or centerline 312 of the stem 308. The stem 308 is connected to a post 314 via a slotted extension arm 318 using threaded nuts 316, which are best seen in FIG. 4. The post 314 is connected to the coloraider opening 112 via a plate 105.

A side view through assembly 134 illustrating the mounting arrangement of the transmitter 202, receiver 204, transceiver 602, or reflector 604, is shown in FIG. 4. In this embodiment, the post 314 has a centerline 402 and is connected directly to an outer pane 404 of the side panel 104. The outer pane 404 is disposed on one side of the insulating material 212, which is also bound by an inner pane 406 disposed on the oven cavity side of the side panel 104. Each of the outer and inner panes 404 and 406 forms an opening that accommodates the tunneling tube 210, such that the line of sight axis 206 can pass unobstructed through the side panel 104. In the illustrated embodiment, a gap 408 is defined between an outer surface of the outer pane 404 and the porthole cover 214. The gap 408 may allow gases from the oven cavity to escape and avoid the accumulation of debris, moisture condensation, or blackening of a surface of the porthole cover 214 facing the oven cavity. The porthole cover 214 in this embodiment is connected to the oven via screws secured by thumbnuts 410 having spacers 412 disposed therebetween defining the gap 408.

As best seen in FIG. 4, and similar to assembly 138 shown in FIG. 3, the receiver 204 is connected to the hinge 310 disposed at the end of the stem 308 by a retention bracket 414. The receiver 204 includes a sensor portion 416, which in the case of the transmitter 202 would be a laser or another type of radiation emitter. A controller portion 418 is connected to the sensor portion 416 and disposed to receive signals indicative of the state of operation of the sensor portion 416, for example, the presence or absence of a received beam. In one embodiment, the controller portion 418 includes an online indicator light 420, a fault indicator light 422, a set/reset button 424, and/or other control input and/or output devices. A connector 426 formed on the receiver 204 is arranged to matingly connect to electric conduits providing information from the receiver 204 to an electronic controller (not shown) arranged to alert an operator of a fault condition of the sensor, relay detection signals indicative of a misalignment condition, and any other type of information that may be available from the receiver.

Figure 5:
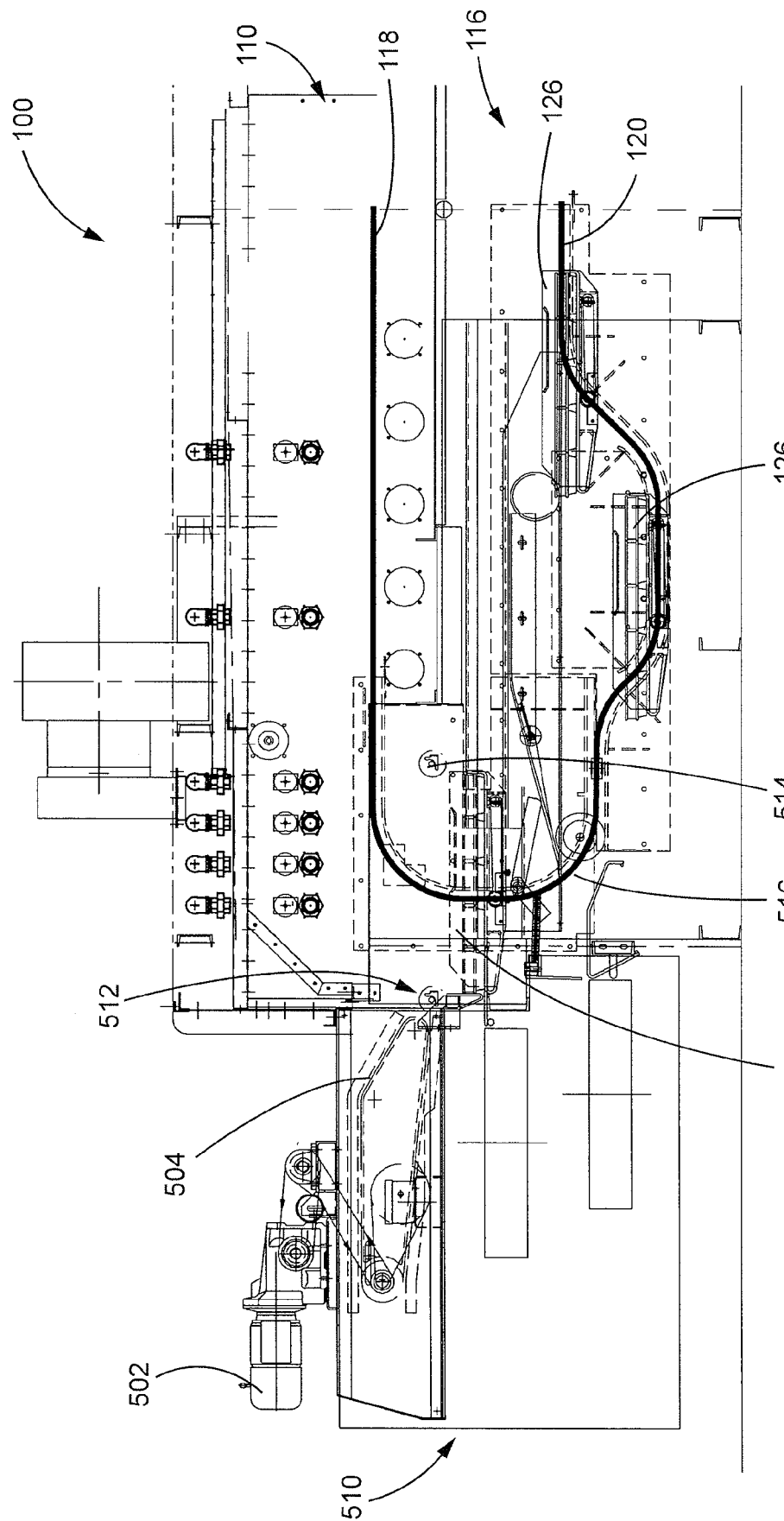
FIG. 5 is a partial elevation of a front portion of a continuous oven in accordance with the disclosure.

As previously discussed, optical sensor assemblies may be further installed at or close to a front end or loading end of an oven. One such embodiment is shown in the elevational view of the front portion of the oven 100 of FIG. 5. The front portion of the oven 100 includes a loader drive 502 operating a loader assembly 504. The loader assembly 504 pushes panned product onto passing trays 126 being conveyed by chains through shoes 516 that transition from the bottom track 120 to the top track 118 during operation of the oven 100. Loaded product on trays 126 is carried through the length of the oven 100 to the rear portion of the oven 100, where the trays 126 transition from the top track 118 to the bottom track 120 as shown and discussed with respect to FIG. 1.

As previously mentioned, one possible misalignment condition of trays 126 at the rear portion of the oven 100 may result when a pan or lid is mis-positioned at loading. In the embodiment illustrated, two sensor assemblies are disposed close to the front oven opening 510. These two sensor assemblies may detect utensil mis-position during loading and/or immediately following loading of product onto trays 126 of the conveyor system. Such detection advantageously provides an early warning of improperly positioned pans or lids, thus enabling immediate action to correct the mis-position that may be required under the circumstances.

More particularly, a first front sensor assembly 512 is disposed close to a transition area between the loader assembly 504 and the rising tray 126 being carried by the conveyor system 116 of the oven 100. The first front sensor assembly 512 may be arranged in a similar fashion with the sensor assemblies disposed at the rear of the oven as previously described.

Accordingly, the first front sensor assembly 512, in one embodiment, includes a transmitter and a receiver or, alternatively, a transceiver and reflector, which are disposed to provide a line of sight sensing area to detect product mis-position onto the trays 126. A typical type of mis-position at this rising tray transition portion of the oven between the loader assembly 504 and tray 126 is an overhang of the panned product. More specifically, a portion of a pan may not be pushed entirely onto tray 126 thus overhanging the front edge of tray 126, in which case a portion of the pan will obstruct the line of sight established by the first front sensor assembly 512 and trigger a signal indicative of the mis-position.

A second front sensor assembly 514 is disposed to provide a line of sight sensing area lying within the oven bake chamber 110 along the bottom-to-top rail transition path of trays 126 at a location where the panned product has been deposited onto tray 126 of conveyor system 116, is completing the transition to the elevation of the top track 118, and is proceeding toward the rear portion of the oven 100. In this location, lids (not shown) that may have been placed onto the panned product are expected to be squarely fitted onto each pan because any mis-position between a lid and a pan may cause the lid to fall off the tray 126 within the oven, especially when the tray 126 having the mis-positioned lid is transported from the top track 118 to the bottom track 120 at the rear of the oven.

Accordingly, the line of sight sensing area of the second front sensor assembly 514 is arranged to extend close to the back-end of each tray 126, sufficiently close to the tray 126 to detect a portion of a lid overhanging the back-end of tray 126 when the lid is not properly positioned.

Figure 7:
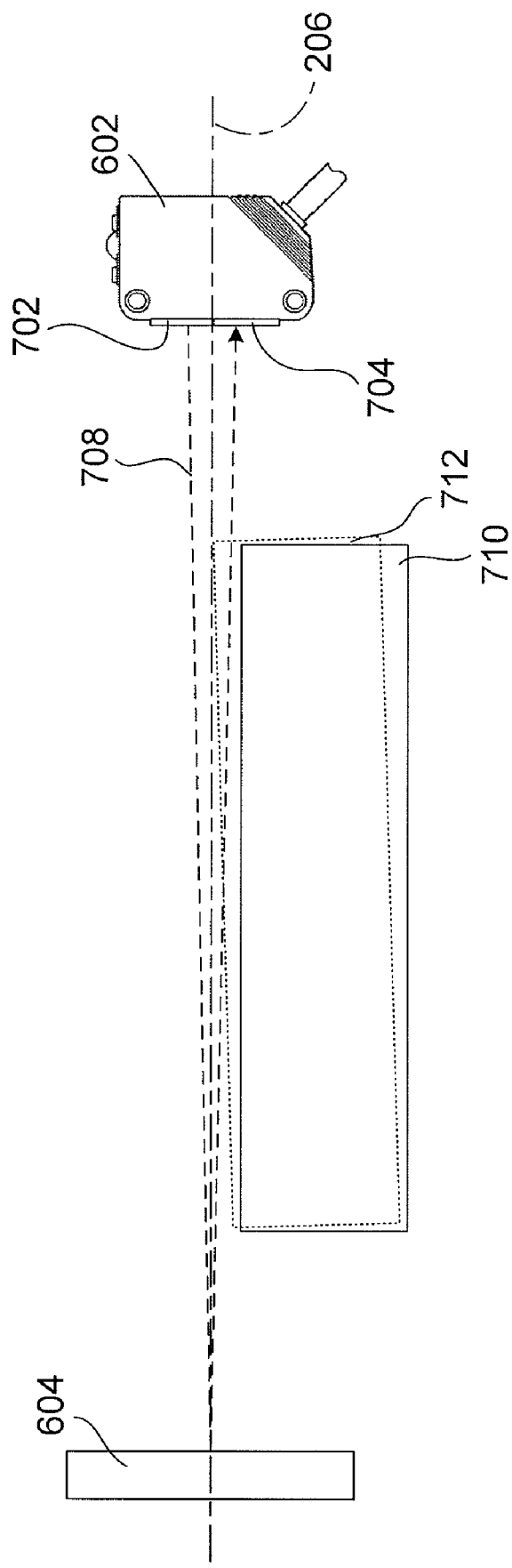
FIG. 7 is a partial side view of a sensor assembly in accordance with the disclosure.

Turning now more specifically to the embodiment shown in FIG. 6, it can be seen that the transceiver 602 and reflector 604 are disposed along the line of sight axis 206 as previously described. A side detail view of the transceiver 602 and the reflector 604 is shown in FIG. 7. In the illustrated embodiment, the transceiver 602 is a Retro-Reflective Laser device manufactured and sold by OMRON EUROPE B.V. of the Netherlands under model number E3Z-LR86, and the reflector is a Reflector device manufactured and sold by Namco of Lancaster, South Carolina, under model number EP175-13900. As previously discussed, the transceiver 602 includes a transmitter portion 702 and a receiver portion 704. In the illustrated embodiment, the transmitter portion 702 is configured to emit a polarized beam of light, for example, a Red LED JIS Class 1, IEC Class 1, FDA Class II LASER having a wavelength of about 655 nm, but other forms of energy may be used. In the illustration of FIG. 7, the light beam is illustrated as a dotted line arrow and denoted by reference numeral 708. The receiver portion 704 is capable of sensing light returning to the transceiver from the reflector 604.

The reflector 604 is a retro-reflector, which is a device configured to reflect light back to its source. In this way, the reflector 604 may reflect the beam 708 back towards the receiver portion 704 of the transceiver 602. Use of a retro-reflector, which is a device that is also commonly referred to as a retro-flector or cataphote, improves the ability of the system to reflect the beam 708 back to the receiver portion 704. Insofar as the reflection of the beam 708 may be affected by certain misalignments that may occur during operation, such as those caused by thermal strain in the mounting components or other factors tending to affect the relative alignment between the transceiver 602 and the reflector 604 relative to the line of sight axis 206, the retro-reflector-type reflector 604 is capable of returning the beam 708 to the receiver portion 704 in a more robust fashion than a reflective mirror may. In this way, while a properly positioned pan or utensil 710 will not interrupt the beam 708, a misaligned tray or mis-positioned utensil 712, which is shown generically in dashed line, will interrupt the beam 708 thus causing the transceiver 602 to provide a signal to the controller (not shown).

Having described the structure and operation of installed sensor assemblies in a continuous or direct recirculation oven, a sample alignment procedure for properly aligning the transmitter and receiver portions of each assembly will now be presented. As previously discussed, the sensor assemblies described herein are positioned external to the oven bake chamber and emit a beam passing through the respective line of sight sensing area within the oven cavity. Therefore, proper alignment of the transmitter and receiver is required for operation of each sensor assembly.

A method of using sensor assemblies includes an alignment procedure for aligning the transmitter and receiver of a sensor assembly with the line of sight sensing area. With the transmitter and receiver mounted onto an oven in approximate locations, a slip of standard-thickness paper may be placed between the receiver and its respective porthole over while the oven is at operating temperature. Power may be provided to the sensor assembly, which in one embodiment will cause a red dot to appear on the paper at the point of incidence of the laser beam emitted by the transmitter. An operator or installer may peer into or through the porthole opening of the transmitter to locate the "red spot" on the opposite or receiver side of the oven. If necessary, the installer may loosen the fasteners securing the bracket of the transmitter to the oven. With the bracket loosened, the transmitter may be rotated to move the "red spot" as close to the sensing portion of the receiver as possible.

Having performed a rough alignment of the transmitter, the same procedure of loosening the bracket of the receiver and rotating the receiver such that the "red dot" is delivered at the center of the sensing portion of the receiver may be conducted to finalize the alignment of the sensor assembly. After the alignment process has been completed, the slip of paper may be removed from between the receiver and its respective porthole cover.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for diagnosing a misalignment or mis-position condition of trays or utensils within a continuous oven having a conveyor system for conveying and positioning trays carrying panned baked goods within an oven bake chamber defined at least in part by two side panels extending parallel to one another, comprising:
   a transmitter configured to emit a beam along a line of sight region extending across the oven bake chamber between the at least two side panels;
   a receiver disposed along the line of sight region and configured to receive the beam emitted by the transmitter;
   a controller operably connected to the receiver and disposed to provide a signal indicative of one of a misalignment and a mis-position condition when a tray carried by the conveyor system interrupts transmission of the beam between the transmitter and the receiver.

2. The system of claim 1, wherein the transmitter and receiver are disposed externally from the oven bake chamber alongside each of two side panels, wherein the two side panels form openings therein inline with the line of sight region, and wherein the transmitter emits a laser beam that extends along the line of sight to the receiver.

3. The system of claim 2, further including a porthole cover covering each opening in the side panels along the line of sight region, wherein the porthole covers are made of a thermally resistant and radiation transmissive material, and wherein each porthole cover is disposed between each of the two side panels and each of the transmitter and receiver.

4. The system of claim 1, further including a reflector configured to reflect the beam, wherein the transmitter and the receiver are integrated into a transceiver device, and wherein the reflector is a retro-reflector.

5. The system of claim 4, wherein the transceiver device and the reflector are disposed externally from the oven bake chamber alongside each of two side panels, wherein the two side panels form openings therein that are disposed inline with the line of sight region, and wherein the transmitter of the transceiver emits a laser beam that extends along the line of sight to the reflector and returns back to the receiver of the transceiver.

6. The system of claim 1, wherein the continuous oven has a generally elongate configuration in which an inlet opening and an outlet opening are disposed over one another at a first end thereof, wherein the conveyor system ferries the trays between a lower and an upper portions thereof at a second end of the continuous oven.

7. The system of claim 6, further including an additional transmitter and an additional receiver disposed around an additional line of sight region and operably associated with the controller, wherein the line of sight region is disposed adjacent the inlet such that it becomes interrupted by a mis-positioned utensil, wherein the additional line of sight region is disposed adjacent the second end of the continuous oven such that is becomes interrupted by one of a misaligned tray and a mis-positioned utensil, and wherein the signal provided by the controller includes a first signal indicative of a mis-positioned condition when the line of sight region becomes interrupted and a second signal indicative of at least one of a mis-positioned condition and a misalignment condition when the additional line of sight region becomes interrupted.

8. An oven, comprising:
   an oven bake chamber defined at least in part by two side panels extending parallel to one another;
   a conveyor system disposed within the bake chamber for conveying and positioning trays;
   a light beam transmitter configured to emit a beam along a line of sight region extending across the oven bake chamber between the at least two side panels;
   a receiver disposed along the line of sight region and configured to receive the beam emitted by the transmitter;
   a controller operably connected to the receiver and disposed to provide a signal indicative of one of a misalignment and a mis-position condition when a tray or utensil carried by the conveyor system interrupts transmission of the beam between the transmitter and the receiver.

9. The oven of claim 8, wherein the transmitter and receiver are disposed externally from the oven bake chamber alongside each of two side panels, wherein the two side panels form openings therein inline with the line of sight region, and wherein the transmitter emits a laser beam that extends along the line of sight to the receiver.

10. The oven of claim 9, further including a porthole cover covering each opening in the side panels along the line of sight region, wherein the porthole covers are made of a thermally resistant and radiation transmissive material, and wherein each porthole cover is disposed between each of the two side panels and each of the transmitter and receiver.

11. The oven of claim 8, further including a reflector configured to reflect the beam, wherein the transmitter and the receiver are integrated into a transceiver device, and wherein the reflector is a retro-reflector.

12. The oven of claim 11, wherein the transceiver device and the reflector are disposed externally from the oven bake chamber alongside each of two side panels, wherein the two side panels form openings therein that are disposed inline with the line of sight region, and wherein the transmitter of the transceiver emits a laser beam that extends along the line of sight to the reflector and returns back to the receiver of the transceiver.

13. The oven of claim 8, wherein the oven is a continuous oven having a generally elongate configuration in which an inlet opening and an outlet opening are disposed over one another at a first end thereof, wherein the conveyor system ferries the trays between a lower and an upper portions thereof at a second end of the continuous oven.

14. The oven of claim 13, further including an additional transmitter and an additional receiver disposed around an additional line of sight region and operably associated with the controller, wherein the line of sight region is disposed adjacent the inlet such that it becomes interrupted by a mis-positioned utensil, wherein the additional line of sight region is disposed adjacent the second end of the continuous oven such that is becomes interrupted by one of a misaligned tray and a mis-positioned utensil, and wherein the signal provided by the controller includes a first signal indicative of a mis-positioned condition when the line of sight region becomes interrupted and a second signal indicative of at least one of a mis-positioned condition and a misalignment condition when the additional line of sight region becomes interrupted.

15. A method for detecting mis-positioned trays or mis-aligned utensils disposed on trays in a continuous oven having a conveyor system disposed within an oven bake chamber of the continuous oven for conveying and positioning trays, comprising:

emitting a beam along a line of sight region extending across the oven bake chamber;

receiving the beam along the line of sight region; and providing a signal indicative of one of a misalignment and a mis-position condition to a controller when a tray or a utensil disposed on the tray carried by the conveyor system interrupts receipt of the beam.

16. The method of claim 15, wherein the beam is emitted by a transmitter and wherein beam is received by a receiver, each of which is disposed externally from the oven bake chamber alongside each of two side panels disposed on opposing sides of the oven bake chamber.

17. The method of claim 15, further including reflecting the beam with a reflector disposed along the line of sight region opposite a transmitter portion of a transceiver disposed to emit the beam, and receiving the beam reflected by the reflector at a receiving portion of the transceiver.

18. The method of claim 17, wherein the transceiver and the reflector are disposed externally from the oven bake chamber alongside each of two side panels, wherein the two side panels form openings therein that are disposed along the line of sight region.

19. The method of claim 15, wherein the oven is a continuous oven having a generally elongate configuration in which an inlet opening and an outlet opening are disposed over one another at a first end thereof, and wherein the method further comprises ferrying the trays between a lower and an upper portions thereof at a second end of the continuous oven with the conveyor system.

20. The method of claim 19, further including emitting an additional beam with an additional transmitter and receiving the additional beam at an additional receiver disposed around an additional line of sight region, wherein the line of sight region is disposed adjacent the inlet such that it becomes interrupted by a mis-positioned utensil, wherein the additional line of sight region is disposed adjacent the second end of the continuous oven such that is becomes interrupted by at least one of a mis-positioned tray and a mis-positioned utensil disposed on the tray, and wherein the signal provided by the controller includes a first signal indicative of a mis-position when the line of sight region becomes interrupted and a second signal indicative of at least one of a misalignment and a mis-positioned condition when the additional line of sight region becomes interrupted.

* * * * *